United States Patent
Cho

(10) Patent No.: US 10,571,018 B2
(45) Date of Patent: Feb. 25, 2020

(54) SHIFT CONTROL METHOD FOR VEHICLE WHEN CAN COMMUNICATION FAIL

(71) Applicants: HYUNDAI MOTOR COMPANY, Seoul (KR); KIA MOTORS CORPORATION, Seoul (KR)

(72) Inventor: Sung Hyun Cho, Yongin-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 445 days.

(21) Appl. No.: 15/639,359

(22) Filed: Jun. 30, 2017

(65) Prior Publication Data

US 2018/0163858 A1 Jun. 14, 2018

(30) Foreign Application Priority Data

Dec. 12, 2016 (KR) .................. 10-2016-0168293

(51) Int. Cl.
*F16H 61/12* (2010.01)
*F16H 61/32* (2006.01)

(52) U.S. Cl.
CPC ............. *F16H 61/12* (2013.01); *F16H 61/32* (2013.01); *F16H 2061/1268* (2013.01)

(58) Field of Classification Search
CPC ...... F16H 61/12; F16H 61/2807; F16H 61/32; F16H 2061/122; F16H 2061/1224; F16H 2061/1256; F16H 2061/126; F16H 2061/1268; F16H 2061/2823; F16H 2061/283; F16H 2061/326; F16H 2306/50
See application file for complete search history.

(56) References Cited

FOREIGN PATENT DOCUMENTS

| JP | 2006-0292110 | 10/2006 |
| KR | 10-2006-0000648 | 1/2006 |
| KR | 10-0598808 B1 | 7/2006 |
| KR | 10-1104043 B1 | 1/2012 |
| KR | 10-1417430 B1 | 7/2014 |

*Primary Examiner* — Jacob S. Scott
(74) *Attorney, Agent, or Firm* — Brinks Gilson & Lione

(57) ABSTRACT

A shift control method for a vehicle when CAN communication fails is provided to make a transmission control unit communicate with a motor controller via an LIN communication line. The shift control method includes: a failure sensing step of sensing, by the transmission control unit, whether the CAN communication fails; a shift stage sensing step of sensing, by the transmission control unit, whether a target shift stage is changed when the CAN communication failure is sensed as a performance result of the failure sensing step; and a gear engaging step of controlling, by the transmission control unit, the motor controller to drive a gear actuator through an LIN communication line so as to engage a target stage gear when the target shift stage is changed as the performance result of the shift stage sensing step.

4 Claims, 3 Drawing Sheets

SHIFT CONTROL METHOD FOR VEHICLE WHEN CAN COMMUNICATION FAIL

CROSS REFERENCE TO RELATED APPLICATION

This application claims the priority to and the benefit of Korean Patent Application No. 10-2016-0168293, filed on Dec. 12, 2016, which is incorporated herein by reference in its entirety.

FIELD

The present disclosure relates to a shift control method for performing vehicle shifting when a controller area network (CAN) communication of a vehicle is impossible.

BACKGROUND

The statements in this section merely provide background information related to the present disclosure and may not constitute prior art.

Typically, a wire harness has been applied between a transmission control unit (TCU) and a gear actuator to control a dual clutch transmission (DCT). In recent years, however, a study on a shift by wire (SBW) system without the wire harness has been actively conducted.

The SBW system is a system for controlling gear shifting through electronic signals. Mainly, each controller transmits and receives the electronic signals desired for shifting by using CAN communication.

If a failure occurs in the CAN communication line applied to the transmission control unit (TCU) for controlling the transmission and the gear actuator, the gear actuator may not be controlled at all, which may lead to a problem in that the vehicle shifting may not be made and the emergency driving of the vehicle may not be made.

The matters described as the related art have been provided only for assisting in the understanding for the background of the present disclosure and should not be considered as corresponding to the related art known to those skilled in the art.

SUMMARY

The present disclosure proposes a shift control method for a vehicle when CAN communication fails, in which a TCU drives a gear actuator via a local interconnect network (LIN) communication line when the CAN communication fails to perform vehicle shifting to thereby control the vehicle to be driven.

In one aspect of the present disclosure, a shift control method for a vehicle when CAN communication fails is provided to make a transmission control unit communicate with a motor controller via an LIN communication line. The shift control method includes: a failure sensing step of sensing, by the transmission control unit, whether the CAN communication fails; a shift stage sensing step of sensing, by the transmission control unit, whether a target shift stage is changed when the CAN communication failure is sensed as a performance result of the failure sensing step; and a gear engaging step of controlling, by the transmission control unit, the motor controller to drive a gear actuator through the LIN communication line so as to engage a target stage gear when the target shift stage is changed as the performance result of the shift stage sensing step.

The gear engaging step may include: a selecting driving step of controlling, by the transmission control unit, the motor controller to drive a selecting actuator through the LIN communication line when an operation of the selecting actuator is desired for the target stage gear engagement; and a shifting driving step of controlling, by the transmission control unit, the motor controller to drive a shifting actuator through the LIN communication line so as to engage the target stage gear after the selecting driving is completed through the selecting driving step.

In the shifting drive step, the transmission control unit may control the motor controller to drive the shifting actuator with a first setting force so that a shift finger reaches a position of the target stage gear in gear and then control the motor controller to drive the shifting actuator with a second setting force so that the shift finger moves toward the target gear side, and the first setting force may be set to be greater than the second setting force.

If the motor controller drives the shifting actuator with the second setting force, the motor controller may output a target stage gear engagement complete signal to the transmission control unit when a driving current is maintained at a value greater than a set current for a set time.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
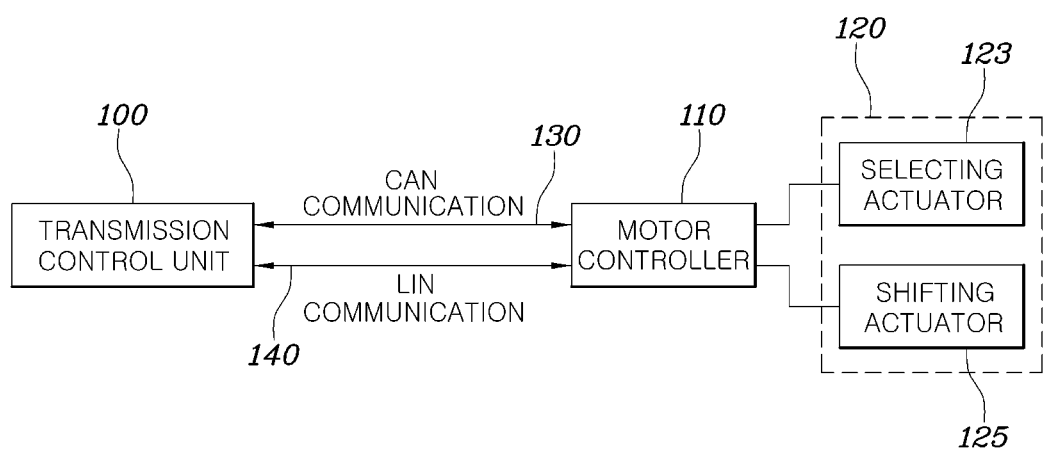
FIG. 1 is a diagram illustrating a shift control device for a vehicle in one exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a shift control method for a vehicle when CAN communication fails in one exemplary form of the present disclosure will be described with reference to the accompanying drawings.

Figure 2:
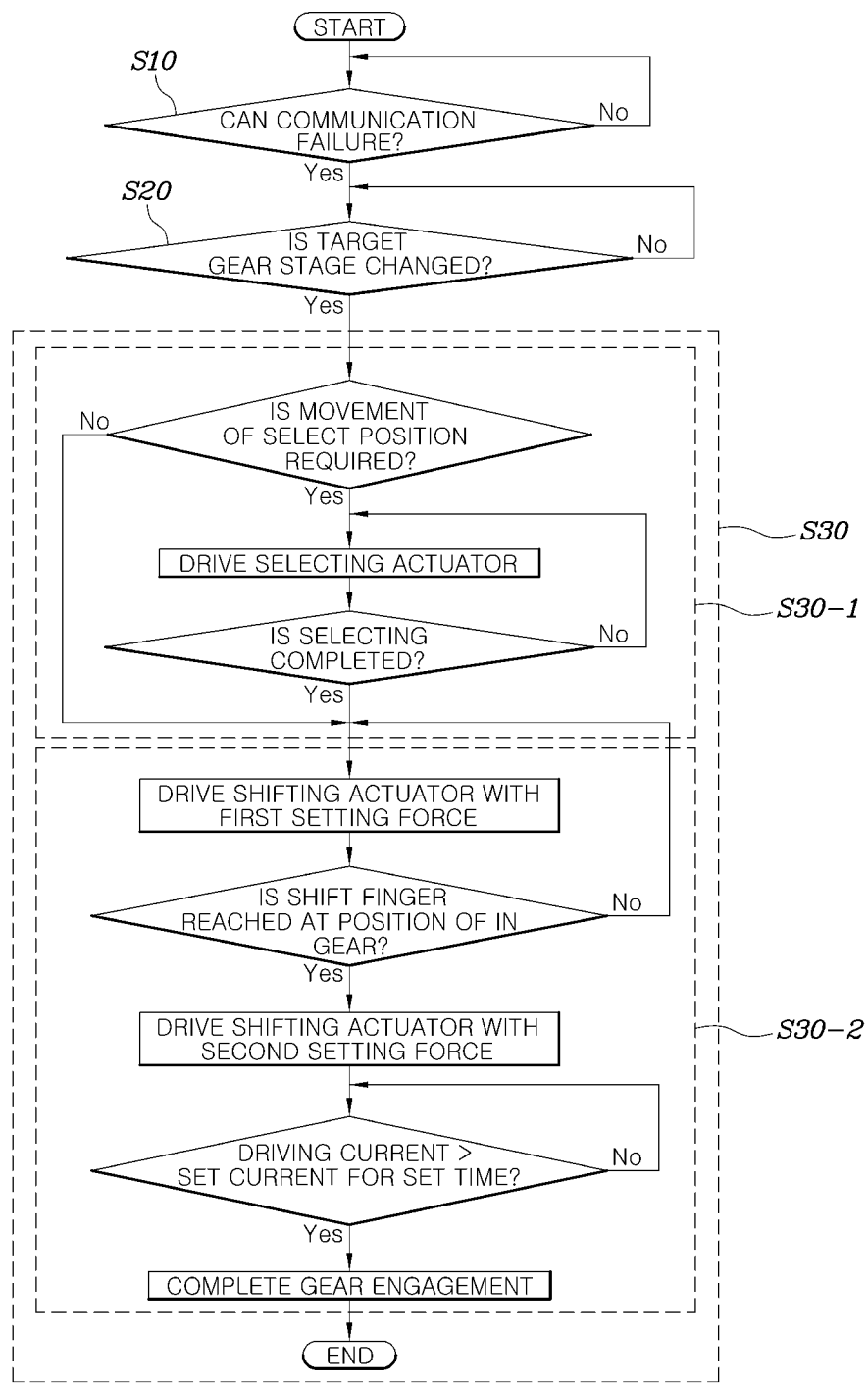
FIG. 2 is a flow chart illustrating a shift control method for a vehicle when CAN communication fails in one exemplary form of the present disclosure.

FIG. 1 is a diagram illustrating a shift control device for a vehicle, and FIG. 2 is a flow chart illustrating a shift control method for a vehicle when CAN communication fails.

Referring to FIGS. 1 and 2, the present disclosure relates to a shift control method for a vehicle when CAN communication fails to make a transmission control unit (TCU) 100 communicate with a motor controller 110 via a CAN communication line 130 and an LIN communication line 140.

The shift control method includes: a failure sensing step (S10) of sensing, by the transmission control unit (100), whether the CAN communication fails; a shift stage sensing step (S20) of sensing, by the transmission control unit 100, whether a target shift stage is changed when the CAN communication failure is sensed as the performance result of the failure sensing step (S10); and a gear engaging step (S30) of controlling, by the transmission control unit 100, the motor controller 110 to drive a gear actuator 120 through an LIN communication line so as to engage a target stage gear when the target shift stage is changed as the performance result of the shift stage sensing step (S20).

At normal condition, the transmission control unit 100 sends a signal to control the gear actuator 120 and communicates with the motor controller 110 through the CAN communication line 130. However, in the present disclosure, the separate LIN communication line 140 is additionally connected between the controller 100 and the motor controller 110. If a failure state occurs so that the CAN communication is impossible, the vehicle shifting may be urgently implemented via the LIN communication.

Specifically, when the transmission/reception data received through the CAN communication line 130 are not received during a reference time, the transmission control unit 100 may determine that the CAN communication is in a failure state (S10).

If it is determined that the CAN communication fails, the transmission control unit 100 determines whether a target shift stage is changed by performing shifting according to the state of the vehicle (S20).

When the CAN communication is in the failure state, and the target shift stage is changed, the transmission control unit 100 controls the motor controller 110 via the separately provided LIN communication line 140 to drive the gear actuator 120, thereby implementing the shifting to the target shift stage (S30).

Here, the LIN communication has a difficulty in normally performing gear shifting as compared with the CAN communication. That is, the transmission control unit 100 may transmit data such as a target angle and a target RPM to the motor controller 110 that drives and controls the gear actuator 120 through the LIN communication, and conversely, the motor controller 110 may transmit the position and drive information of the gear actuator 120 to the transmission control unit 100. Accordingly, the present disclosure is directed to a method of implementing gear stage shifting using data in the limited communication environment.

In the present disclosure, the gear engaging step S30 includes: a selecting driving step (S30-1) of controlling, by the transmission control unit 100, the motor controller 110 to drive the selecting actuator through the LIN communication line 140 when the operation of the selecting actuator 123 is desired for the target stage gear engagement; and a shifting driving step (S30-2) of controlling, by the transmission control unit 100, the motor controller 110 to drive the shifting actuator 125 through the LIN communication line 140 to engage the target stage gear after the selecting driving is completed through the selecting driving step (S30-1).

Here, the gear actuator 120 includes the selecting actuator 123 that moves a shift finger in a select direction and a shifting actuator 125 that moves the shift finger in a shift direction.

Therefore, when the target shift stage is changed in response to the state change of the vehicle in the state where the CAN communication fails, the transmission control unit 100 primarily outputs a control signal to allow the motor controller 110 to drive the selecting actuator 123 if the shifting of the target shift stage requests the movement of the shift finger in the selecting direction, thereby completing the selecting shifting (S30-1).

Thereafter, the transmission control unit 100 may output the control signal to allow the motor controller 110 to drive the shifting actuator 125 for the target stage gear engagement (S30-2).

At this point, in the shifting driving step S30-2, the transmission control unit 100 controls the motor controller 110 to drive the shifting actuator 125 with a first setting force so that the shift finger reaches a position of a target stage gear in gear and then controls the motor controller 110 to drive the shifting actuator 125 with a second setting force so that the shift finger moves toward the target gear side, in which the first setting force is set to be greater than the second setting force.

That is, the transmission control unit 100 controls the motor controller 110 to drive the shifting actuator 125 with the first setting force until the shift finger reaches the position of the in gear and then to drive the shifting actuator 125 with the second setting force that is a larger set value, thereby reducing or preventing the impact at the time of the target stage gear engagement.

Here, the transmission control unit 100 controls the motor controller 110 to drive the shifting actuator 125 with the first setting force. At this point, the transmission control unit 100 transmits a target stroke value to the motor controller 110 so that the target stage gear moves to a stroke that is the position of the in gear. The motor controller 110 drives the shifting actuator 125 on the basis of the received target stroke value and transmits feedback information to the transmission control unit 100 when the shift finger reaches the position of the in gear so that the transmission control unit 100 figures out that the shift finger reaches the position of the in gear.

Further, if the motor controller 110 drives the shifting actuator 125 with the second setting force, the motor controller 110 may output a target stage gear engagement complete signal to the transmission control unit 100 when a driving current is maintained at a value larger than the set current for a set time.

That is, if the motor controller 110 continuously drives the shifting actuator 125 with the second setting force, the shifting actuator 125 stops at a shift end point and thus a driving current value is increased. At this point, if the drive current has a value larger than the preset current and is maintained for the set time, the motor controller 110 may be determined that the shift finger reaches the shift end point.

Thereafter, the motor controller 110 transmits the shift complete signal to the transmission control unit 100, and thus may decide that the transmission control unit 100 completes the vehicle shifting through the LIN communication line 140.

Figure 3:
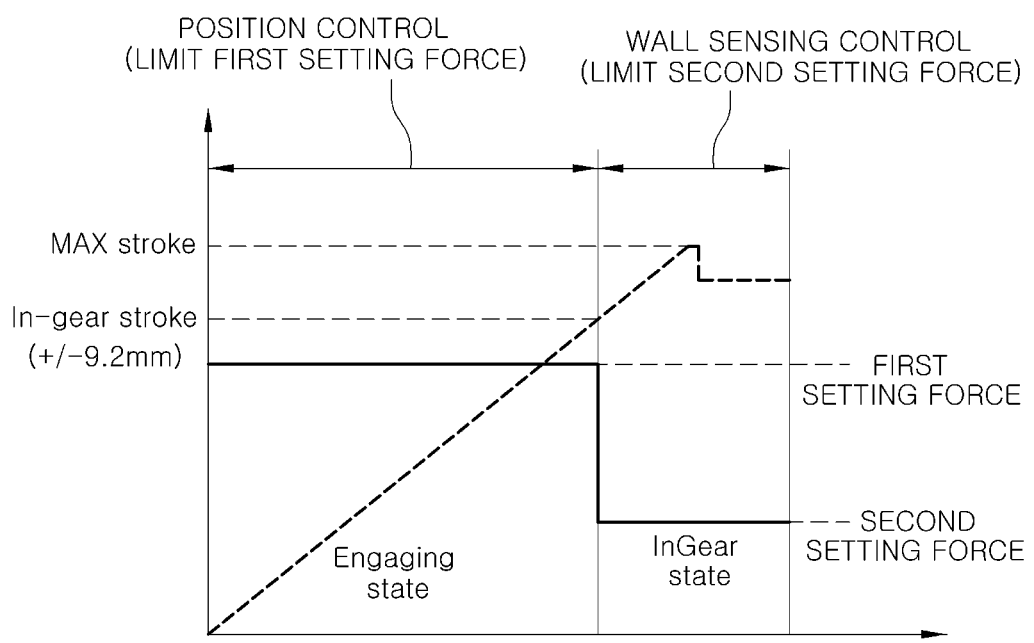
FIG. 3 is a graph illustrating desired motor power with respect to a stroke in one exemplary form of the present disclosure.

FIG. 3 is a graph illustrating desired motor power with respect to a stroke in an exemplary form of the present disclosure. Referring to FIG. 3, it may be confirmed that the gear actuator is driven with the first setting force until the stroke of the gear actuator reaches the position of the in gear, and a limp-home control of a vehicle is performed while the gear actuator is driven with the second setting force after the stroke enters the position of the in gear.

According to the shift control method for a vehicle when the CAN communication fails as described above, the limited communication system (e.g., the LIN communication) may be used even in the failure state of the CAN system to perform the gear shifting, such that the vehicle may be driven normally and the driving stability of the driver may be provided.

In addition, only the LIN communication system is added as the system for preparing for the failure of the CAN system, and therefore the emergency driving logic may be implemented at low cost.

According to the shift control method for a vehicle when the CAN communication fails and the above-mentioned structure, the vehicle shifting may be implemented via the separate LIN communication when the CAN communication fails, and therefore the vehicle may be driven even when the CAN communication is impossible, thereby improving the vehicle commerciality.

Although the present disclosure has been shown and described with respect to specific exemplary forms, it will be obvious to those skilled in the art that the present disclosure may be variously modified and altered without departing from the spirit and scope of the present disclosure.

What is claimed is:

1. A shift control method for a vehicle when a controller area network (CAN) communication fails to make a transmission control unit communicate with a motor controller via a CAN communication line and a local interconnect network (LIN) communication line, the shift control method comprising:
    a failure sensing step of sensing, by the transmission control unit, whether the CAN communication fails;
    a shift stage sensing step of sensing, by the transmission control unit, whether a target shift stage is changed when the CAN communication failure is sensed as a performance result of the failure sensing step; and
    a gear engaging step of controlling, by the transmission control unit, the motor controller to drive a gear actuator through the LIN communication line so as to engage a target stage gear when the target shift stage is changed as the performance result of the shift stage sensing step.

2. The shift control method of claim 1, wherein the gear engaging step includes:
    a selecting driving step of controlling, by the transmission control unit, the motor controller to drive a selecting actuator through the LIN communication line when an operation of the selecting actuator is desired for the target stage gear engagement; and
    a shifting driving step of controlling, by the transmission control unit, the motor controller to drive a shifting actuator through the LIN communication line so as to engage the target stage gear after the selecting driving is completed through the selecting driving step.

3. The shift control method of claim 2, wherein the shifting drive step includes: controlling, by the transmission control unit, the motor controller to drive the shifting actuator with a first setting force so that a shift finger reaches a position of the target stage gear in gear and then to control the motor controller to drive the shifting actuator with a second setting force so that the shift finger moves toward a target stage gear side, and
    setting the first setting force to be greater than the second setting force.

4. The shift control method of claim 3, further comprising: when the motor controller drives the shifting actuator with the second setting force, outputting, by the motor controller, a target stage gear engagement complete signal to the transmission control unit when a driving current is maintained at a value greater than a set current for a set time.

* * * * *